(12) United States Patent
Ahmed

(10) Patent No.: US 10,069,405 B2
(45) Date of Patent: Sep. 4, 2018

(54) ELECTRICAL CONVERSION

(71) Applicant: University of Plymouth, Plymouth, Devon (GB)

(72) Inventor: Mohammed Ahmed, Wembury (GB)

(73) Assignee: University of Plymouth, Plymouth, Devon (GB)

( * ) Notice: Subject to any disclaimer, the term of this patent is extended or adjusted under 35 U.S.C. 154(b) by 0 days.

(21) Appl. No.: 15/543,134

(22) PCT Filed: Dec. 17, 2015

(86) PCT No.: PCT/GB2015/054047
§ 371 (c)(1),
(2) Date: Jul. 12, 2017

(87) PCT Pub. No.: WO2016/113526
PCT Pub. Date: Jul. 21, 2016

(65) Prior Publication Data
US 2017/0373588 A1 Dec. 28, 2017

(30) Foreign Application Priority Data
Jan. 14, 2015 (GB) .................... 1500567.1

(51) Int. Cl.
*H02M 3/07* (2006.01)
*H02M 1/12* (2006.01)
*H02M 1/42* (2007.01)

(52) U.S. Cl.
CPC ....... *H02M 1/4233* (2013.01); *H02M 1/4208* (2013.01); *H02M 2001/4283* (2013.01)

(58) Field of Classification Search
CPC ........ H02M 1/12; H02M 1/14; H02M 1/4208; H02M 1/4233; H02M 3/07; H02M 3/073;
(Continued)

(56) References Cited

U.S. PATENT DOCUMENTS 9,673,310 B2 * 6/2017 Schie .................. H01L 29/7455
9,742,310 B2 * 8/2017 Ahmed ................. H02M 7/217
(Continued)

FOREIGN PATENT DOCUMENTS

EP 0798838 10/1997
JP H04109870 A 4/1992
(Continued)

OTHER PUBLICATIONS

International Search Report and Written Opinion for International Patent Application No. PCT/GB2015/054047 dated Mar. 16, 2016.
(Continued)

*Primary Examiner* — Adolf Berhane
(74) *Attorney, Agent, or Firm* — Andrus Intellectual Property Law, LLP

(57) ABSTRACT

An apparatus and method for use in electrical conversion are described. The apparatus includes a bridge rectifier having an input side and an output side, and a switched capacitor line connected across the output side of the rectifier, wherein the switched capacitor line includes a capacitor, a charging leg and a switched discharge leg, and wherein the charging leg incorporates a transistor controlled so as to maintain a substantially constant charging current when the transistor is conductive.

7 Claims, 1 Drawing Sheet

(58) Field of Classification Search
CPC ...... H02M 7/10; H02M 7/219; H02M 5/4585; H02J 7/0024; H02J 7/0073; H02J 7/345
USPC .......... 363/44, 59, 61, 62, 81, 84, 125–127; 320/166, 167
See application file for complete search history.

(56) References Cited

U.S. PATENT DOCUMENTS

2015/0180355 A1* 6/2015 Freeman ................ H02M 1/08 363/21.04
2015/0207402 A1* 7/2015 Kwan ................ H02M 1/4241 363/44

FOREIGN PATENT DOCUMENTS

| JP | H05300743 A | 11/1993 |
| JP | H06 209574 | 7/1994 |
| WO | 97/26701 | 7/1997 |
| WO | 2014/202538 A2 | 12/2014 |

OTHER PUBLICATIONS

Great Britain Search Report for GB1500567.1 dated Aug. 10, 2015.

* cited by examiner

ELECTRICAL CONVERSION

CROSS-REFERENCE TO RELATED APPLICATIONS

This application is the U.S. national stage application of International Application PCT/GB2015/054047, filed Dec. 17, 2015, which international application was published on Jul. 21, 2016, as International Publication WO 2016/113526 in the English language. The International Application claims priority of United Kingdom Patent Application 1500567.1, filed Jan. 14, 2015.

BACKGROUND

This invention relates to a method and apparatus for use in the conversion or rectification of an AC supply to provide a DC output. The apparatus may form part of, for example, a power supply for an electrical or electronic device.

The use of a bridge rectifier to rectify an AC signal, producing a varying DC output is well known. One disadvantage associated with the use of bridge rectifiers is that the DC output varies significantly, varying between substantially the peak input AC magnitude and zero. One technique that is commonly used to reduce the variation in the output signal is to provide a smoothing capacitor connected across the output of the bridge rectifier, the capacitor charging and discharging in use to smooth the output signal. Whilst the provision of such a smoothing capacitor operates satisfactorily in many applications, there is still a significant output variation or ripple. Furthermore, the capacitor must typically be relatively large, both in terms of its capacitance and in terms of its dimensions. As a result, accommodation of such a capacitor in some applications may be challenging.

The power factor of arrangements of the type outlined hereinbefore is typically relatively low, for example in the region of 0.3 to 0.6. Furthermore, where used in medium or high voltage applications, especially those in which the associated load has to be switched, the generation of harmonics can result in the need to provide additional circuitry to suppress such harmonics, adding additional complexity and expense to the arrangement.

SUMMARY

It is an object of the invention to provide a method and apparatus for use in electrical conversion in which at least some of the disadvantages associated with known conversion schemes are overcome or are of reduced effect.

According to an aspect of the invention there is provided an apparatus for use in electrical conversion comprising a bridge rectifier having an input side and an output side, and a switched capacitor line connected across the output side of the rectifier, wherein the switched capacitor line comprises a capacitor, a charging leg and a switched discharge leg, and wherein the charging leg incorporates a transistor controlled so as to maintain a substantially constant charging current when the transistor is conductive.

By maintaining a substantially constant charging current during periods in which charging of the capacitor is taking place, the presence of a surge current at the commencement of charging can be avoided.

The transistor is conveniently connected such that a voltage applied to a base thereof is controlled, at least in part, by a zener diode. However, this need not always be the case, and a resistor based potential divider using appropriately selected components could be used, if desired.

In such an arrangement, when the output from the bridge rectifier is greater than a predetermined value and is higher than that of the capacitor then charging of the capacitor at a constant current will occur. Once a point is reached at which the capacitor charge exceeds the rectifier output then charging will cease, the capacitor charge being maintained until such time as the switch of the switched discharge leg is controlled to allow discharge of the capacitor.

By appropriate selection of the components used in the apparatus, the period of time over which charging occurs and the peak charge of the capacitor can be controlled.

The invention further relates to an electrical conversion method comprising providing a bridge rectifier having an input side and an output side, and a switched capacitor line connected across the output side of the rectifier, wherein the switched capacitor line comprises a capacitor, a charging leg and a switched discharge leg, the charging leg incorporating a transistor, and controlling the transistor so as to maintain a substantially constant charging current when the transistor is conductive.

BRIEF DESCRIPTION OF THE DRAWINGS

The invention will further be described, by way of example, with reference to the accompanying drawings, in which.

DETAILED DESCRIPTION OF THE DRAWINGS

Figure 1:
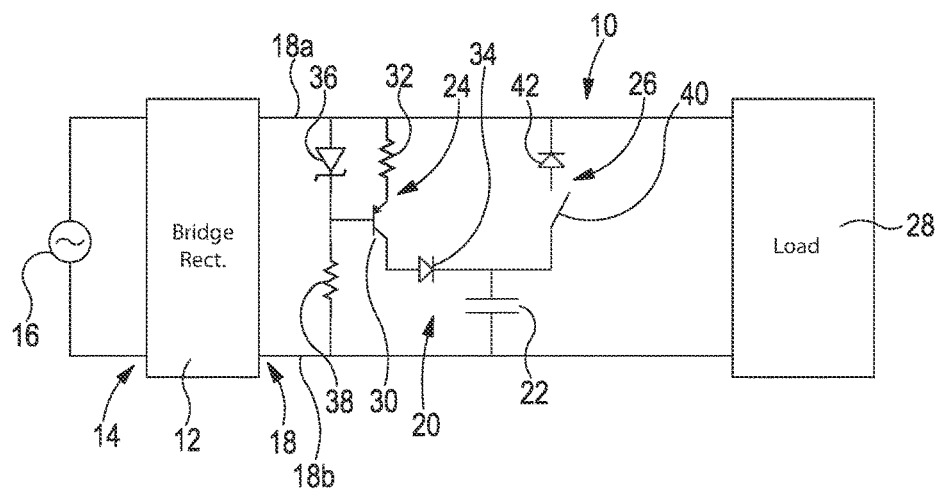
FIG. 1 is a circuit diagram illustrating an apparatus in accordance with an embodiment of the invention.

Referring firstly to FIG. 1, an electrical conversion apparatus 10 is illustrated, the apparatus comprising a bridge rectifier 12 having an input side 14 connected to an AC supply 16 and an output side 18. Connected across the output side 18 is a switched capacitor line 20.

The switched capacitor line 20 comprises a capacitor 22, a charging leg 24 whereby charging of the capacitor 22 may occur, and a switched discharge leg 26 whereby the capacitor 22 can be discharged to satisfy a load 28.

The charging leg 24 comprises a transistor 30 the collector of which is connected via a resistor 32 to the high output line or side 18a and the emitter of which is connected via a diode 34 to the capacitor 22. The base of the transistor 30 is held at a level controlled by a zener diode 36 and a resistor 38 connected between the high output line 18a and the ground line 18b.

The switched discharge leg 26 comprises a suitable switch 40 and a diode 42. The switch 40 may comprise, for example, a suitably controlled MOSFET or IGBT.

The resistor 38 is chosen to ensure that, when the voltage on the high output line 18a exceeds a predetermined level, a sufficient current flows through the zener diode 36 to ensure that the zener diode maintains a constant or substantially constant potential difference between the high output line 18a and the base of the transistor 30. As a result, a substantially constant current flows through the resistor 32, transistor 30 and diode 34, charging the capacitor 22.

Figure 2:
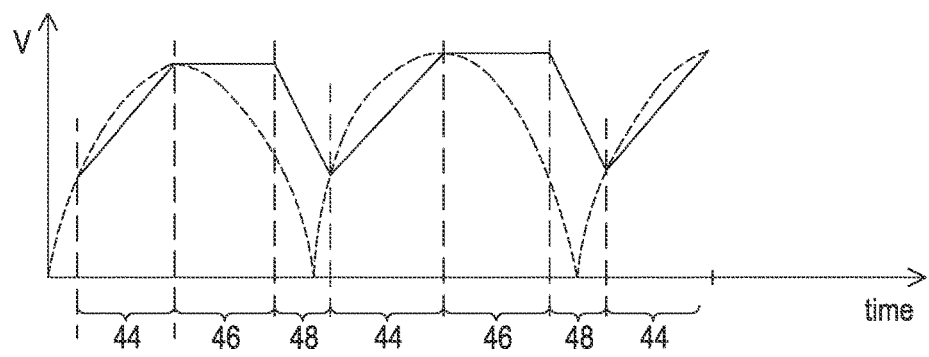
FIGS. 2 and 3 are diagrams illustrating the operation of the apparatus of FIG. 1.

As shown in FIG. 2 and identified as a first mode or period 44, during such operation charging of the capacitor 22 continues at a constant or substantially constant rate until a point is reached at which the charge of the capacitor exceeds the supply thereto from the output side 18 of the bridge rectifier 12. During the mode 44, the load 28 is satisfied from the output of the bridge rectifier 12. Once this point is reached, further charging of the capacitor 22 cannot take place. The load 28 continues to be satisfied from the output of the bridge rectifier 12. Discharge of the capacitor 22 is prevented by the diode 34 and by the switch 40 being open, as denoted in FIG. 2 by a second mode or period 46. During this mode 46, therefore, the capacitor 22 remains charged.

At a subsequent point, the switch 40 is closed whereon discharge of the capacitor 22 can commence, the discharge from the capacitor 22 being used to satisfy the load 28 during this third mode or period 48.

Figure 3:
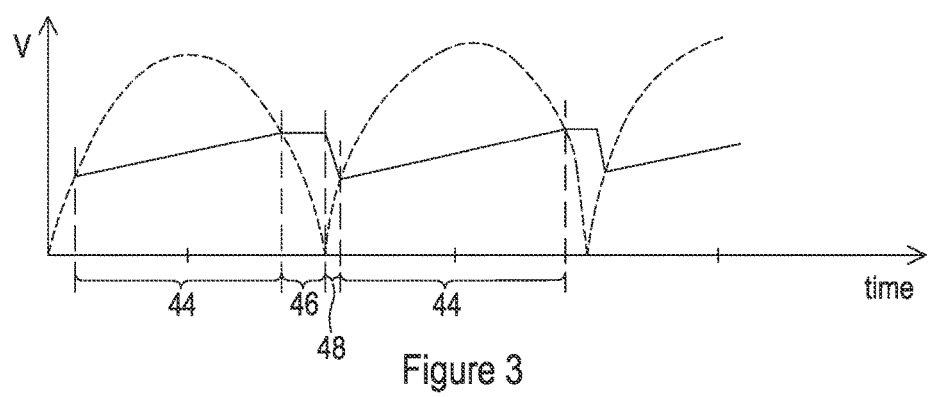

The durations of the modes 44, 46, 48 and maximum charge of the capacitor 22 can be controlled by appropriate selection of the components of the circuit and by appropriate control over the operation of the switch 40. By way of example, by changing the resistance provided by the resistor 32, the charging current can be changed. By reducing the charging current, the duration of the first mode 44 can be extended as illustrated in FIG. 3. Extending the duration of the first mode 44 in this manner can result in the charging current being approximately symmetric about the peak of the output voltage from the bridge rectifier. The enhanced symmetry can result in an enhanced power factor.

Whilst in the description hereinbefore a zener diode 36 is used in controlling the voltage applied to the base of the transistor 30 to maintain a substantially constant current flowing through the transistor 30 to the capacitor 22 when the transistor 30 is conductive, this need not always be the case. By way of example, the zener diode 36 could be replaced by a resistor whilst still achieving a substantially constant charging current to the capacitor 22 provided the resistance of the resistor 32 is much smaller than that of the resistor 38.

It will be appreciated that the electrical conversion schemes outlined hereinbefore are advantageous in that they use relatively few components. The capacitor 22 can be of small size, thus the packaging issues associated with known arrangements are overcome. As mentioned hereinbefore, as the capacitor charging current is substantially constant, there is no significant surge upon commencement or termination of charging. The arrangement only requires control over the operation of a single switch, and so is relatively simple to operate.

The apparatus may conveniently be incorporated into a power supply for an electronic or electrical device, for example for use with consumer electronics such as computer equipment, televisions or audio equipment. It will be appreciated, however, that it may be used with or incorporated into a wide range of other devices.

The description hereinbefore relates to specific example embodiments of the invention. It will be appreciated, however, that the invention is not restricted in this regard and may be modified without departing from the scope of the invention as defined by the appended claims.

The invention claimed is:

1. An apparatus for use in electrical conversion comprising:
    a bridge rectifier having an input side and an output side; and
    a switched capacitor line connected across the output side of the rectifier, wherein the switched capacitor line comprises a capacitor, a charging leg and a switched discharge leg including a switch, and wherein the charging leg incorporates a transistor controlled so as to maintain a substantially constant charging current when the transistor is conductive, wherein when the output from the bridge rectifier is greater than a predetermined value and is higher than that of the capacitor then the transistor is controlled such that charging of the capacitor at a constant current occurs, once a point is reached at which the capacitor charge exceeds the rectifier output to the capacitor charging will cease, the switched discharge leg being controlled such that the capacitor charge is maintained, and subsequently controlling the switch of the switched discharge leg to allow discharge of the capacitor.

2. The apparatus according to claim 1, wherein the transistor is connected such that a voltage applied to a base thereof is controlled, at least in part, by a zener diode.

3. The apparatus according to claim 1, wherein the transistor is connected such that a voltage applied to a base thereof is controlled, at least in part, using a resistor based potential divider.

4. The apparatus according to claim 1, wherein the period of time over which charging occurs is substantially symmetrical about the peak output voltage from the bridge rectifier.

5. The apparatus according to claim 1 and forming part of a power supply for electrical or electronic equipment.

6. An electrical conversion method comprising:
    providing a bridge rectifier having an input side and an output side, and a switched capacitor line connected across the output side of the rectifier, wherein the switched capacitor line comprises a capacitor, a charging leg and a switched discharge leg including a switch, the charging leg incorporating a transistor; and
    controlling the transistor so as to maintain a substantially constant charging current when the transistor is conductive, wherein when the output from the bridge rectifier is greater than a predetermined value and is higher than that of the capacitor then the transistor is controlled such that charging of the capacitor at a constant current occurs, once a point is reached at which the capacitor charge exceeds the rectifier output to the capacitor charging will cease, the switched discharge leg being controlled such that the capacitor charge is maintained, and subsequently controlling the switch of the switched discharge leg to allow discharge of the capacitor.

7. The method according to claim 6, wherein the period of time over which charging occurs is substantially symmetrical about the peak output voltage from the bridge rectifier.

\* \* \* \* \*